US008727289B2

(12) United States Patent
Abbott

(10) Patent No.: US 8,727,289 B2

(45) Date of Patent: May 20, 2014

(54) CABLE CLAMP

(75) Inventor: Richard Abbott, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 12/835,577

(22) Filed: Jul. 13, 2010

(65) Prior Publication Data

US 2011/0006169 A1 Jan. 13, 2011

Related U.S. Application Data

(60) Provisional application No. 61/225,131, filed on Jul. 13, 2009.

(51) Int. Cl.
*F16L 3/08* (2006.01)

(52) U.S. Cl.
USPC ............................... 248/74.4; 248/71; 248/73

(58) Field of Classification Search
USPC .............................. 248/73, 70, 71, 74.4, 74.5
See application file for complete search history.

(56) References Cited

U.S. PATENT DOCUMENTS

| | | | | |
|---|---|---|---|---|
| 2,092,372 | A * | 9/1937 | Goeller | 439/781 |
| 3,816,051 | A * | 6/1974 | Houghton | 425/388 |
| 3,821,691 | A * | 6/1974 | Reimer | 439/391 |
| 4,037,810 | A * | 7/1977 | Pate | 248/68.1 |
| 4,070,082 | A * | 1/1978 | Werner | 439/417 |
| 4,480,808 | A * | 11/1984 | Reimer | 248/73 |
| 4,555,100 | A * | 11/1985 | Ditto | 269/166 |
| 4,580,769 | A * | 4/1986 | Pappas | 269/88 |
| 4,941,844 | A * | 7/1990 | Bowden et al. | 439/425 |
| 5,378,171 | A * | 1/1995 | Czerlanis | 439/425 |
| 6,505,391 | B1 * | 1/2003 | Berna | 29/434 |
| 6,540,769 | B1 * | 4/2003 | Miller, III | 606/216 |
| 7,645,173 | B2 * | 1/2010 | Larkin | 439/781 |
| 2002/0070316 | A1 * | 6/2002 | Howe | 248/62 |

* cited by examiner

*Primary Examiner* — Amy J Sterling

(74) *Attorney, Agent, or Firm* — Berliner & Associates

(57) ABSTRACT

An apparatus and method for clamping one or more cables is provided comprising a first component and a second component, wherein the first and second components each have a main body, a cut out region, and a connector region; and wherein the two components are removably coupled by connecting together their respective connector and cut out regions. The clamping force to the cables can be determined solely by finger pressure, which permits the user to have excellent tactile feedback to safely clamp a cable bundle. The apparatus is compatible with mass production injection molding and can be used for applications requiring UHV compatibility.

8 Claims, 3 Drawing Sheets

8
10
17
4
14
6
12
6

CABLE CLAMP

CROSS-REFERENCE TO RELATED APPLICATIONS

This application claims the benefit of Provisional Patent Application No. 61/225,131, filed Jul. 13 2009, which is hereby incorporated by reference in its entirety.

STATEMENT REGARDING FEDERALLY SPONSORED RESEARCH OR DEVELOPMENT

The U.S. Government has certain rights in this invention pursuant to Grant No(s). PHY0107417 and PHY0757058 awarded by the National Science Foundation.

FIELD OF THE INVENTION

The invention relates to a cable clamp. More particularly, the invention relates to clamps used in an ultra high vacuum environment.

BACKGROUND OF THE INVENTION

While working within ultra-high vacuum chambers, it is often required that electrical cables are carefully routed to avoid damage to the cables or elements of the experiment. Standard cable clamping systems can damage the fragile cable bundles during the act of tightening the clamp. Such conventional clamping systems are generally comprised of a bolt or screw applying pressure to a clamping plate or saddle, the amount of clamping force is difficult to ascertain due to the unpredictable amount of friction in the screw threads. Moreover, such conventional systems are usually made of metals, which can lead to the problem that the cable being clamped can have its outer metallic shield electrically connected to the surface to which it is clamped. This electrical connection can cause grounding and shielding problems in electrical systems. Damaged cables resulting from the use of such conventional cable clamping systems result not only in the electrical device becoming inoperative but damaged cables may also harm the user. Thus, there is a need in the field for a clamping system that does not damage the cable bundles during the tightening process, and one that permits excellent tactile feedback to safely clamp the cable bundle.

Some conventional clamping systems, such as the tie wrap type fastener, allow clamping of a relatively wide range of cable sizes. However, such tie wrap fasteners are only one-time use devices, in that they have to be irreparably cut before the held cables can be released, or if the adjustments have to be made.

BRIEF SUMMARY OF THE INVENTION

The present invention overcomes the foregoing drawbacks.

In contrast to the above-described the cable clamp presented in this disclosure permits the user to have excellent tactile feedback to safely clamp a cable bundle. The design is compatible with mass production injection molding and can be used for applications requiring UHV compatibility. In another embodiment, the clamp can be made from less expensive plastics for use in everyday applications not requiring UHV compatibility.

In one embodiment, an apparatus for clamping one or more cables is provided comprising a first component and a second component, wherein the first and second components each have a main body, a cut out region, and a connector region; and wherein the two components are removably coupled by connecting together their respective connector and cut out regions.

In another embodiment, the coupling of the first and second components of the apparatus in the immediately preceding paragraph results in a clamping force on the cable. In a more particular embodiment, the this clamping force is determined by finger pressure. In yet another embodiment, the clamping force is determined without the use of screws or other ratcheting mechanisms.

In another embodiment, an apparatus for clamping one or more cables is provided comprising a first component and a second component, wherein the first and second components each have a main body, a cut out region, and a connector region; wherein the two components are removably coupled by connecting together their respective connector and cut out regions, and a hole located on the main body of each of the two components.

In one embodiment, a method of clamping cables is provided comprising attaching a first component, with a main body, a connector region and a cut out region, to a surface; routing a cable under the connector region of the first component, and coupling a second component to the first component.

In a more particular embodiment of the method of the immediately preceding paragraph, coupling of the first and said second component results in a clamping force being exerted on the cable. In yet a more particular embodiment, the clamping force is determined by finger pressure.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
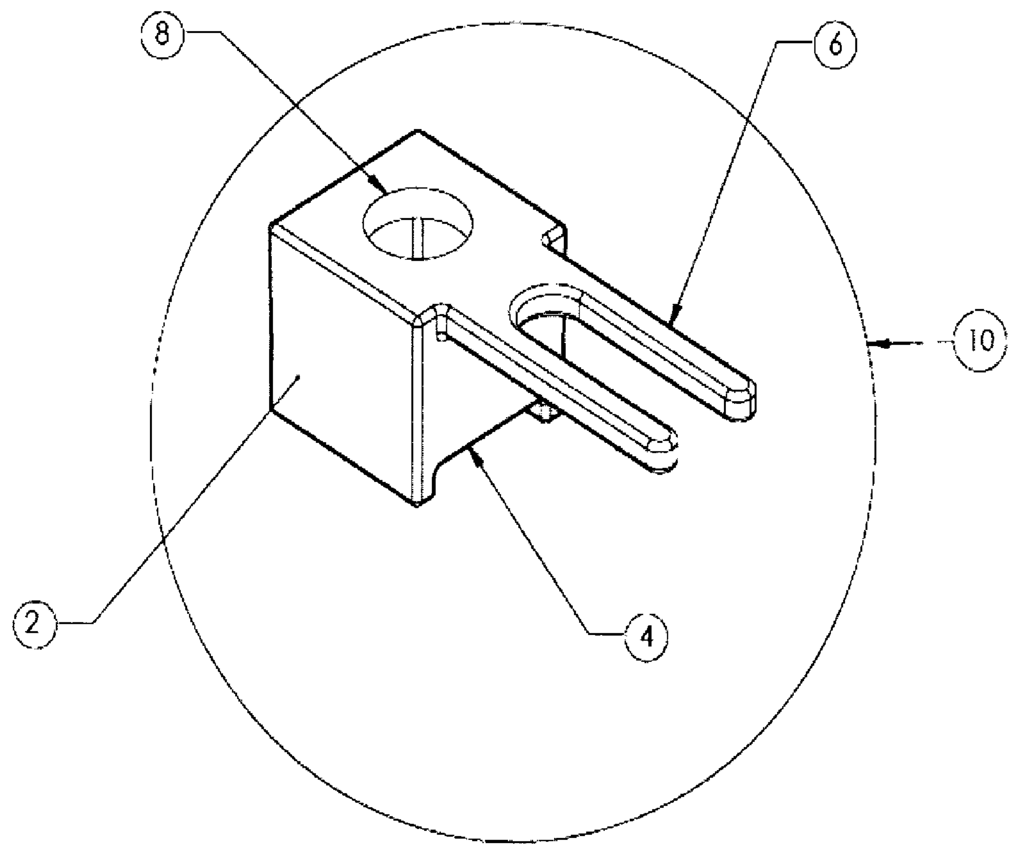
FIG. 1 shows a 3D rendering of one component/half of the clamping system.

FIG. 1 shows a particular embodiment disclosing a first component 10 of the clamp with a main body 2, cutout region 4, two fork shaped projections 6 (i.e. a connector region), and a hole 8.

In one embodiment, a connector element, such as but not limited to a bolt or screw can be inserted into hole 8, and the hole screw threaded. In an alternative embodiment, the hole 8 has no screw threading.

Figure 2:
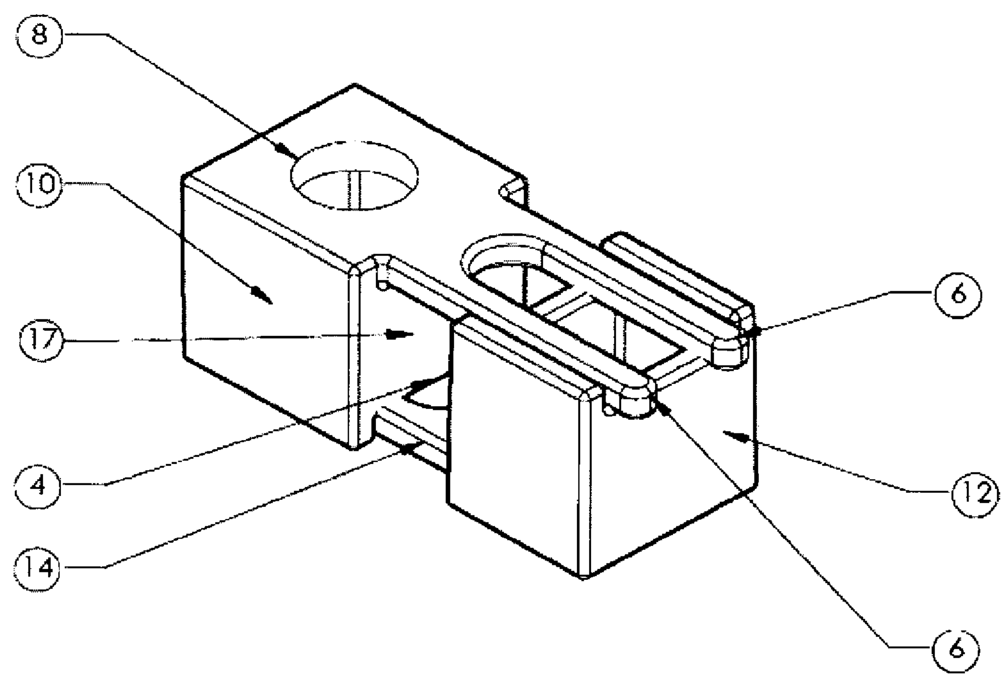
FIG. 2 shows the clamping system with both identical components combined, and a socket-head screw passing through the two halves.

FIG. 2 shows the first component 10 being combined with a second component 12 to form the clamping system. In this example, the second component 12 is identical in shape to the upper component, which allows them to be manufactured in one molding operation. However, the second component 12 can be a different shape than the first component 10.

FIG. 2 shows the cutout region 4 of the first component 10 accepting the fork shaped projections 14 of the second component 12, and similarly the two fork shaped projections 6 of component 10 are received by the cutout region of the second component 12. In another embodiment, the inner main body surface 17 of each component, that will reside closer to the cables, could be shaped from the simple flat wall shown here to a more complex shape such that larger contact area is achieved on the cable or component being clamped. For instance, the final shape of the surface 17 could conform more readily to the anticipated type of cable dimensions to be used, thereby allowing the cables to be held more securely.

In yet another embodiment, the inner main body surface 17 could be lined with material that can conform to the shape of the cables being held, such as but not limited to rubber and foam.

In this particular embodiment of FIG. 2, although identical shapes for the first and second component are shown, it is also possible to use a second component with a different shape to the first (and vice a versa), as long as they have a connector region that can snugly connect with the cut-out region of the coupling component, and a cut out region that can accepts the connector region of the other component.

Figure 3:
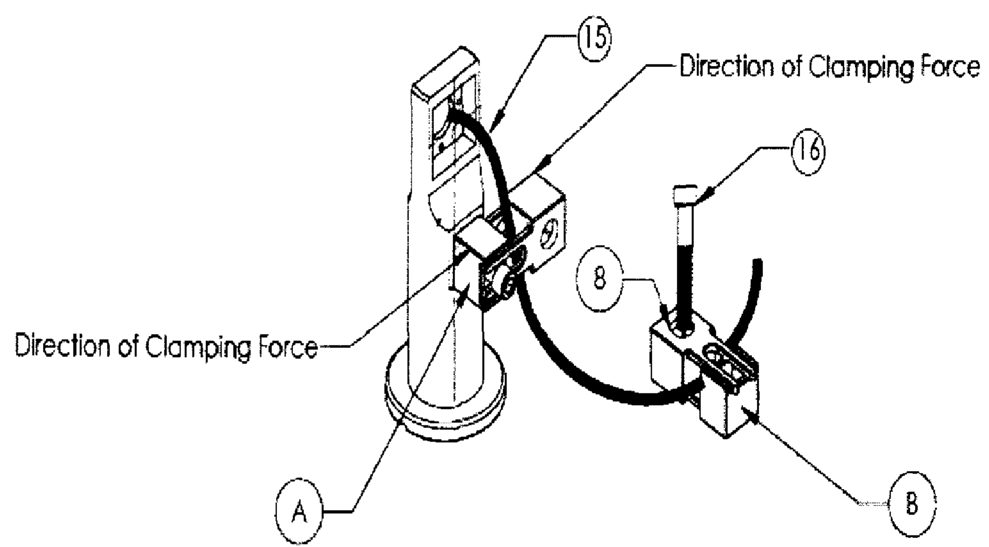
FIG. 3 shows two clamps in operation securing a cable.

In FIG. 3, a cable 15 is shown being held between the two clamping systems A and B, wherein each clamping system comprises of two separate components, as described above. System A shows in one embodiment the two components affixed with a connector element to a vertical beam/surface. In this embodiment, the connector element is inserted down and through the fork shaped projections of the upper component, entering the underside of hole 8 of the lower second component. In this embodiment, the head of the connector element (i.e. the bolt head) has to be large enough in diameter so that the connector can tightly secure the fork shaped projections of the upper component underneath it. However, it is also possible to affix the two components to the vertical surface using a connector inserted through hole 8 of the upper component (as shown in FIG. 3*b*).

In the clamping system B shown in FIG. 3, a screw 16 is shown to be inserted into hole 8, of the upper component thereby removably affixing both components to a horizontal ancillary structure/surface. In an alternative embodiment, a connector element can be inserted through the fork shaped projections of the upper component (as shown in FIG. 3A).

In yet another embodiment, the clamping system does not have to be affixed to an ancillary surface (embodiment not shown). Here instead of affixing the connector element to an ancillary surface, once a nut like element is inserted into either the mounting hole, or through the fork shaped projections, a nut (or its equivalents) can be attached to the protruding end of the connector element. Tightening of this nut will then create sufficient pressure to maintain coupling of both components without needing to attach the components to any surface.

Although hole 8 is shown in FIGS. 1 and 2 that allows the user to affix both components with the cable to the ancillary apparatus, the hole is not necessary since other methods known to those of skill in the art (i.e. Velcro, etc.), may serve to affix the components.

One or both components can be made of material allowing the clamp system to be used for high requiring UHV compatibility (for instance for use in aeronautics or space engineering applications). Such materials include, but are not limited to, polymer, Stainless Steel, Aluminum, Ceramic. In a more particular embodiment, Poly-ether-ether-ketone (PEEK) Victrex TDS 450GL30 can be used.

Such UHV compatible materials can be formed into the shape of the components of the clamping system using either injection molding, or direct machining, methods known to those of skill in the art.

Alternatively, one or both components can also be made of material allowing the clamp to be used in applications not requiring UHV compatibility, such as less expensive plastics including, but not limited to, nylon, polycarbonate, carbon fiber, polyethylene or derivatives thereof.

In a particular embodiment, the clamping action results from the horizontal closing together of connector region of the first component into the cut out region of the second component and vice a versa. A cable is routed between the main bodies of both components, and then finger pressure exerted on either half/component body determines clamping force applied to the cable (see FIG. 3, which shows in one embodiment, the direction of clamping force being applied to the components). Thus, clamping force is set in contrast to conventional clamps is determined/set without the use of screws, any other ratcheting/winding mechanism, or their equivalents. In screw clamping, it is difficult to tell how much pressure you are exerting, possibly resulting in damage to the cable being clamped.

By connecting/sliding one half/component with respect to the other, this clamp will accommodate a wide range of cable sizes from several centimeters in diameter to millimeters; or from about several centimeters to about zero since the two halves/components of the clamp can be pressed together tightly so that no gap between components is apparent. Moreover, the system as disclosed allows for readjustment of the clamping pressure should cables need to be replaced or adjusted without irreparably damaging the clamping system. The clamping system provided can also accommodate a variety of cable geometries, such as but not limited to square, flat ribbon, oval or even irregular shapes.

The clamping system as provided, also enables for vibration free clamping of cables because the cables can be securely held by finger pressure adjustment of the clamping force. This contrasts with some prior art clamps whose clamping force cannot be finely adjusted because they serve only to form a structure/cage to surround and attach the cables to a surface. Consequently, in these conventional systems such cables are loose enough to cause vibrations in the instruments/devices to which the cable is actually attached. Such cable caused vibrations could ultimately damage these instrumentation.

In one embodiment, the choice of PEEK material allows the clamp to be compatible with ultra-clean, ultra-high vacuum environments encountered in research settings as well as space-craft.

In one embodiment, the first component of the clamp is attached via the socket head screw/bolt to a surface, the cable(s) are then routed under the fork shaped projections and the second component is added to finish the assembly. This can be done with rubber gloves on your hands, as is often the case in UHV work. There is little worry of dropping the pieces during assembly into a potentially confined or sensitive place.

In one embodiment, when the user tightens the screw in the hole 8 seen in FIG. 2, the body of the upper first clamp bears on the forks of the second lower clamp, thus facilitating coupling of the second clamp to the first and affixing of both components to the ancillary surface.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. An apparatus for clamping one or more cables comprising: a first component and a second component, wherein the first and second components each have a main body, a cut out region, and a connector region, the main body of each component comprising a mounting hole and the connector region of each component comprising an opening; and wherein the two components are removably coupled by connecting together their respective connector and cut out regions, the connector region of each component being received by the cut out region of the other component such that the two components are oriented upside down relative to each other, the connecting regions and cut out regions being coupled such that the mounting hole of each component is aligned with the connector region opening of the other component to allow a threaded connector to be inserted into the mounting hole and through the connector region opening, and when the threaded connector is inserted through the mounting hole of at least one component and tightened, the main body of the at least one component bears on the respective connector region of the other component so as to maintain coupling;

wherein the coupling of the first and second components results in a clamping force that is determined-by finger pressure and without the use of screws or a ratcheting mechanism, and wherein one or more cables can be securely held by finger pressure adjustment of the clamping force without damaging the one or more cables.

2. The apparatus of claim 1, wherein the two components are identical in shape.

3. The apparatus of claim 1, wherein the threaded connector can be inserted through the mounting hole either from the connector region side of the main body or the cut out region side of the main body.

4. The apparatus of claim 3, wherein the threaded connector can removably attach the two components together and the components to an ancillary surface.

5. The apparatus of claim 1, wherein cable of various dimensions can be held by said apparatus.

6. The apparatus of claim 1, wherein the apparatus is reusable.

7. The apparatus of claim 1, wherein the main body of one or both components has an inner main body surface that can be shaped to facilitate holding of said one or more cables between the two components.

8. The device of claim 1, wherein the clamping force is determined solely by finger pressure, which permits a user to have tactile feedback.

* * * * *